United States Patent [19]

Johnson, Jr. et al.

[11] 4,103,848
[45] Aug. 1, 1978

[54] VARIABLE INCIDENCE HELICOPTER STABILATOR AND FAIL SAFE ACTUATOR

[75] Inventors: Raymond G. Johnson, Jr., Milford; Lou S. Cotton, Monroe, both of Conn.; David J. Verzella, North Palm Beach, Fla.

[73] Assignee: United Technologies Corporation, Hartford, Conn.

[21] Appl. No.: 775,670

[22] Filed: Mar. 8, 1977

[51] Int. Cl.$^2$ .............................................. B64C 11/44
[52] U.S. Cl. ................................. 244/17.13; 244/182; 244/194
[58] Field of Search .......................... 93/178 R, 178 H; 91/363 A; 235/150.2, 150.22; 244/17.11, 17.13, 17.19, 17.21, 178, 179, 181–185, 191, 196, 197, 194; 318/563–565, 584; 340/27 R, 27 AT, 27 SS

[56] References Cited

U.S. PATENT DOCUMENTS

| | | | |
|---|---|---|---|
| 2,225,002 | 12/1940 | Focke | 244/17.21 |
| 3,143,693 | 8/1964 | Fearnside et al. | 244/194 X |
| 3,145,330 | 8/1964 | Hecht | 318/564 |
| 3,309,588 | 3/1967 | Martin et al. | 318/564 |
| 3,721,404 | 3/1973 | Albert | 244/17.19 |
| 3,813,990 | 6/1974 | Coppola et al. | 244/194 X |
| 3,920,966 | 11/1975 | Knemeyer et al. | 244/17.13 X |

Primary Examiner—Stephen G. Kunin
Attorney, Agent, or Firm—M. P. Williams

[57] ABSTRACT

A helicopter stabilator, combining the functions of tail stabilizer and aircraft elevator, has its angle of incidence with respect to the helicopter controlled by means of a pair of reversible actuators acting in series, controlled in a closed-loop fashion by electronic hardware, the controls being disconnected when the actuators fail to track within a threshold disparity of either position or rate of change of position of each other. A test switch introduces an imbalance to test the fault circuitry. The stabilator is biased to assume a maximum incidence position at low speeds, including hover; and inputs from airspeed and collective pitch position cause it to assume a substantially level position at higher, cruise speeds. A pitch rate gyro input controls the stabilator for stable flight against pitch-inducing flight commands and external effects, such as gusts. In one embodiment a canted tail rotor which provides tail lift; to overcome tail-up and tail-down effects of the downward component of the tail rotor due to more or less thrust and real or apparent lateral accelerations, a lateral accelerometer is used. To avoid main rotor downwash against the stabilator at hover, the lateral accelerometer and collective pitch inputs are washed-out at low speeds. The bias allows final adjustment for high speed flight.

15 Claims, 7 Drawing Figures

VARIABLE INCIDENCE HELICOPTER STABILATOR AND FAIL SAFE ACTUATOR

The invention disclosed herein was made under or in the course of a contract with the Department of the Army.

BACKGROUND OF THE INVENTION

1. Field of the Invention

This invention relates to helicopters, and more particularly to electronic control of stabilator surface and fail safe operation of positioning actuator systems.

2. Description of the Prior Art

Helicopters of the type using a single main rotor have a vertical tail rotor to prevent the aircraft from acquiring angular acceleration in a direction opposite to the rotation of the main rotor when in flight. Such helicopters are generally provided with a tail stabilizer which consists of a simple horizontal surface that provides aerodynamic pitch stability while the helicopter is in forward flight. Typically, the tail stabilizer may be mounted very high on the tail pylon so that the substantially vertical component main rotor downwash during hover and at low speeds does not react against the stabilizer surface, and typically such a single surface, which can be mounted on the pylon opposite to the tail rotor itself, suffices to provide adequate stability.

It has been known in helicopters of the prior art to provide a certain degree of control over the position of the stabilizer so that it may provide additional aerodynamic control to the attitude of the helicopter when in forward flight. A completely-manually controlled stabilator is described in U.S. Pat. No. 2,630,985; a stabilator working directly from the collective pitch lever is shown in U.S. Pat. No. 3,081,052; in a compound helicopter, the elevator segments of fixed stabilators are controlled by a stick in a fashion similar to a normal, fixed wing aircraft, as shown in U.S. Pat. No. 3,105,659; and, control over a variable angle of incidence stabilator in response to the cyclic pitch controls of a helicopter is illustrated in U.S. Pat. No. 3,721,404.

In the normal, single-main-rotor helicopter, which has a vertical stabilizing tail rotor, all of the lift to the helicopter is provided through the main rotor hub. Since the tail is a great distance away from the main hub, any weight near the tail is known to be difficult to lift, unless it is counterbalanced by comparable weight forward of the main rotor. In some circumstances, it becomes necessary to provide lift at the rear of a single-main-rotor helicopter. One solution is to cant the tail rotor so that some component of its thrust is in the downward direction, thereby providing lift directly at the extreme rear of the helicopter. However, having a canted tail rotor adds significant complexity to the achievement of aerodynamic stability of a helicopter, both in terms of the response of the helicopter to its own control surfaces, and in terms of response to external forces such as air pockets, gust inputs, and the like. If the design parameters of a helicopter include very stable high speed flight at extremely low altitudes, such as for a combat helicopter, a pair of stabilators, one on either side of the tail of the helicopter may be desirable. Additionally, control inputs to the stabilator which allow it to react to external inputs such as air density variations, wind gust inputs, and the like may be desirable.

In any helicopter having elevator-like controls, with respect to which the vertical position of the tail and/or the pitch attitude of the aircraft can be very rapidly changed during high speed flight by changes in the stabilator angle of incidence, great care must be taken to prevent any faults from allowing undesired angles of meaningful magnitude from occurring. For instance, if a stabilator were to erroneously receive a command for an extreme tail-surface-down position, the helicopter could pitch nose-down so quickly so as to reach an uncorrectable flight condition which could result in a crash. Therefore, it becomes most essential that any automatic helicopter stabilator operation be totally fail safe. This not only means that faults must be detectable, but they must be detectable and any undesirable response must be prevented in a very rapid fashion.

SUMMARY OF THE INVENTION

Objects of the present invention include provision of improved stability control for a helicopter stabilizing elevator; provision of such improved stability in a helicopter having a canted tail rotor; and provision of fail safe operation of an elevator-stabilizer in a helicopter.

According to a first aspect of the present invention, a critical aircraft parameter, such as the position of an elevating stabilizer of a helicopter rotatable through various angles of incidence, is controlled by substantially equal, joint action of a pair of series-acting actuators, each of which is separately driven by uniquely-related, separate control means, the positioning of each of the actuators being compared with that of the other to determine unlike operation of a magnitude sufficient to indicate fault. In further accord with this aspect of the invention, both the position and the rate of change of position of the two actuators are compared against disparity limits. In still further accord with this aspect of the present invention, indication of a fault disengages the automatic controls from the actuators, and permits the pilot to trim the actuator positions in a desired fashion, in dependence upon the conditions of flight. In accordance further with this aspect of the invention, the fault sensing function is tested by a purposefully induced disparity in actuator position commands.

In accordance with a second aspect of the present invention, improved, automatic control over a helicopter stabilator includes pitch stabilization, to offset pitch resulting from commands to change collective pitch, by causing the stabilator to be responsive to collective pitch position, and to offset these and other pitch inputs, such as may be induced by effects of a canted tail rotor or by external forces (such as wind gusts and the like), by means of a pitch rate gyro input to the stabilator controls.

According to another aspect of the present invention, the automatic control over a stabilator includes means for compensating for the effects in pitch resulting from lateral movement (such as side slip) of a canted tail rotor, which alters the lift of the tail. In further accord with this aspect of the present invention, the angular position of the stabilator is responsive to a lateral accelerometer.

In accordance with the present invention, both collective pitch and lateral acceleration effects on the stabilator are totally removed at low airspeeds.

According to yet another aspect of the present invention, airspeed is used to control the stabilator through combined high gain and low gain loops, to provide for a rapid transition from a depressed stabilator (for avoiding main rotor downwash at low speed and hover) to a level stabilator (for stabilized flight at cruise speeds), yet also to compensate for steady state collective pitch inputs which are required only to achieve speed in flight, while at the same time utilizing collective pitch input as a lead against nose-up or nose-down conditions to further stabilize the flight under varying collective flight command environments.

In accordance with another aspect of the present invention, a bias is used to permit adjustment for a horizontal stabilator at maximum airspeed with maximum collective pitch.

The present invention allows use of a stabilator to assist in controlling the pitch attitude of an aircraft during forward flight by causing the stabilator to react to inputs from a pitch rate gyro. The invention also assists in compensating for a tendency to cause the aircraft to rotate about its pitch axis due to the effects of a canted tail rotor which result from side slip (a deviation in heading from the direction of flight), by causing the stabilator to respond to inputs from lateral acceleration. However, the invention avoids conflicting demands on the stabilator at hover as a consequence of apparent lateral accelerations which are inherent in the aerodynamics of the helicopter during hover, by eliminating the lateral acceleration input at low speeds, and transitioning the lateral accelerations into full effect at moderate cruise speeds. Washing out the collective pitch input at low speeds permits use of bidirectional (minus as well as plus) collective pitch response during high speed flight, yet ensuring the stabilator will be insensitive to main rotor downwash effects during low speed flight. Washing out the lateral acceleration input to the stabilator controls at low speeds is conveniently done in the same manner as the washout for collective pitch.

By comparing the actual position response of two independently-controlled actuators operating in series, erratic operation can be detected, while at the same time ignoring a permissible lag in response (such as may occur from aerodynamic loading of the stabilator, whereby both actuators lag behind the commanded inputs and exhibit large servo errors).

The foregoing and various other objects, features and advantages of the present invention will become more apparent to those skilled in the art in the light of the following detail description of exemplary embodiments thereof, as illustrated in the accompanying drawing.

DETAILED DESCRIPTION

As used herein, the term "low speed" and "low speeds" means speeds at which there is a significant vertical component of the main rotor downwash on the stabilator, including hover. As an example herein, the term "high speed" or "high speeds" means speeds at which the free stream dynamic pressures are significant, which is equivalent to aerodynamic stabilizing action by the stabilator; in the examples herein, such speeds are in excess of approximately 80 knots. As used herein, the term "transition speed" or "transition speeds" means speeds between low speeds and high speeds as defined hereinbefore. It should be understood that these speeds may vary in dependence upon the performance requirements of a helicopter utilizing aspects of the present invention, and are not even fixed with respect to any particular helicopter.

Figures 1, 2:
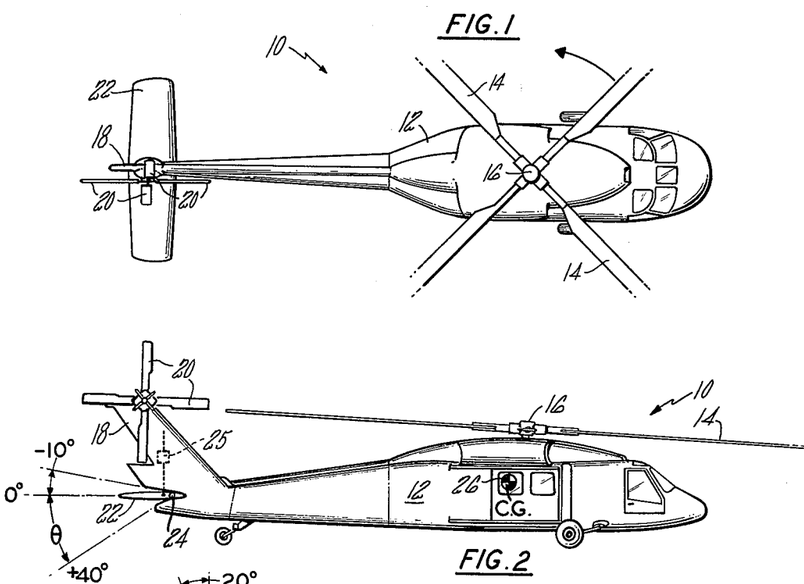
FIG. 1 is a simplified top elevation view of a helicopter having a canted tail rotor and a stabilator.
FIG. 2 is a simplified side elevation view of the helicopter of FIG. 1.
Figure 3:
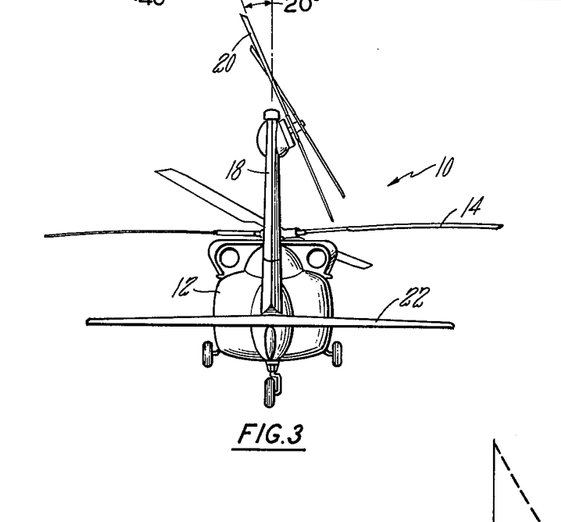
FIG. 3 is a simplified rear elevation view of the helicopter of FIG. 1.

Referring now to FIGS. 1–3, a helicopter 10 includes a fuselage 12 and a main rotor 14 which rotates (counterclockwise in the embodiment shown in FIG. 1) about a rotor hub 16. The helicopter 10 includes a tail pylon 18, at the top of which is mounted a tail rotor 20 which provides counter-rotative thrust to the tail of the fuselage 12 so that the fuselage will not tend to rotate clockwise against the forces of the rotor 14 rotating counterclockwise during flight. In this embodiment, as shown in FIG. 3, the tail rotor 20 is canted at an angle of 20° from the vertical so as to provide some lift thrust to the tail. At the base of the pylon 18 is a stabilator 22 which is pivoted at 24 to the fuselage 12 so as to be rotatable by an actuator assembly 25 through angles of incidence of +40° (tail up), which is with the extreme rear edge of the stabilator 22 in a maximum downward direction, and a position of −10° (tail down), which is with the extreme rear edge of the stabilator in a slightly upward direction, as illustrated in FIG. 2.

Ignoring for the moment the effects of the canted tail rotor, when the helicopter is hovering, there is a significant downward component of the downwash from the main rotor 14; it has been known, therefore, that in order to render the stabilator insensitive to the downwash, so as to avoid having the downwash push the tail of the helicopter down during hover, a stabilator mounted low on the tail must be rotated into a high positive angle of incidence (such as +40° as shown in FIG. 2 herein) during hover. Similar reasoning applies commensurately at low speeds of flight. On the other hand, when the aircraft is cruising at high speeds in forward flight, it is desired to have the stabilator substantially horizontal so as to provide maximum aerodynamic flight stability, as well as providing a certain amount of lift to the tail of the aircraft.

If the center of gravity 26 of the helicopter is aft of the hub 16, any increase in collective pitch will cause nose-up rotation of the aircraft about its pitch axis (substantially through the center of gravity 26, as seen in FIG. 2) so that, in forward flight, a corresponding increase in angle of incidence of the stabilator is desired to raise the tail commensurately. Thus, in the invention herein, collective pitch is coupled to the controls of the angle of incidence of the stabilator 22 such that an increase or decrease in collective pitch will cause an increase or decrease, respectively, in the angle of incidence, except at low speeds, where the collective pitch is washed out and other inputs drive the stabilator to maximum angle of incidence.

Similarly, as is the case in fixed-wing aircraft, should an external input, such as a wind gust, cause the aircraft to rotate about its pitch axis, it is desirable to have the stabilator react correspondingly so as to tend to maintain level flight. As is seen in FIG. 3, the canted tail rotor 20 provides a certain amount of vertical lift at the tail. When this is the case, the center of gravity 26 (FIG. 2) can be farther back from the main lift provided at the hub 16. In such a case, the effects of collective pitch in causing nose-up rotation of the aircraft about its pitch axis, as described hereinbefore, is greater. Therefore, the effects of collective pitch position and of pitch from any causes may be greater in a helicopter having a canted tail rotor. According to the invention, improved control over the stabilator is provided by a pitch rate gyro input to stabilator incidence angle, so as to act in conjunction with the collective pitch input intending to stabilize level flight as a consequence of either collective or longitudinal cyclic pitch inputs, or external inputs.

The use of a canted tail rotor (as seen in FIG. 3) also causes pitching moments as a consequence of yaw, lateral motion, and side slips. For instance, if the aircraft goes into a left side slip, so that the tail swings to starboard (to the right as seen in FIG. 3) this will have an increasing thrust effect on the rotor (since the rotor will be translating through the air that it is pushing against, in a direction opposite to the push). The increasing thrust effect will cause a tail-up condition, which should be adjusted by the stabilator by means of a negative angle input to the stabilator so as to push the tail back down. In accordance with the invention, a lateral accelerometer will provide lateral coupling to the stabilator so as to accommodate this effect. As is known, the tendency of the tail rotor to push the entire aircraft laterally (to the right as shown in FIG. 3 in the embodiment herein) must be compensated during hover by port lateral cyclic pitch, which in turn automatically causes the helicopter to tilt slightly low on the left side, thereby creating an apparent starboard lateral acceleration; this in turn tends to cause a negative angle of incidence to the stabilator (raising its rear edge), which in turn, causes the stabilator to become more sensitive to the vertical component of rotor downwash during hover, thereby pushing the tail down. For this reason, in accordance with the invention, the coupling between the lateral accelerometer and the stabilator is washed out low speeds, including hover.

Figure 4:
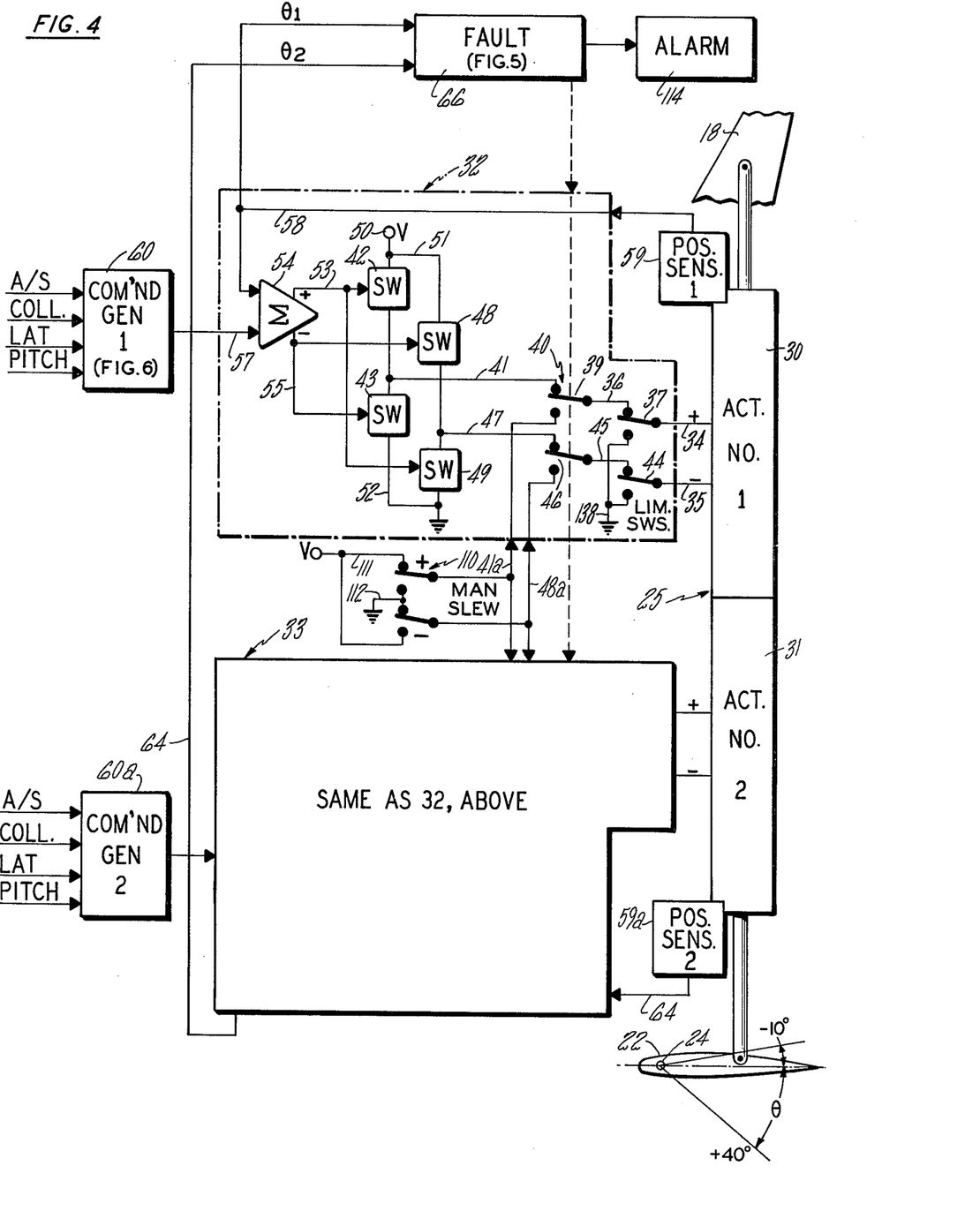
FIG. 4 is a simplified, schematic block diagram of a stabilator control system and a fail safe positioning system in accordance with the present invention.

Referring now to FIG. 4, the actuator assembly 25 actually comprises, in accordance with the present invention, a pair of actuators 30, 31 which may be of the well-known rotary jack-screw type, having reversible DC motors to cause relative rotation between a lead screw and a keeper so as to cause the ends of the lead screw to advance inwardly or outwardly in dependence upon the direction of motion of the motors. Since the controls 32 for the actuator 30 are identical to the controls 33 for the actuator 31, only the controls to the actuator 30 are described herein.

The actuator 30 can be energized so as to cause it to move in a direction to provide positive angles of incidence or, alternatively, negative angles of incidence of the stabilator 22, in dependence on the direction of current flow through two electrical leads 34, 35 thereto. For instance, and only by way of example, if positive DC voltage is applied to the lead 34 and ground is connected to the lead 35, then movement of the stabilator to increase the angle of incidence positively may result; similarly, if positive DC voltage is connected to the lead 35 and the lead 34 is grounded, then the actuator 30 will move so as to decrease the angle of incidence of the stabilator, in a manner which is known in the art.

The lead 34 is normally connected to a line 36 through a limit switch 37; however, if the stabilator reaches the desired extent of its travel, the contact 37 will be transferred so as to be connected via line 138 to ground, thereby preventing any further energization of the actuator 30 in the positive direction. The line 36 is normally passed through a contact 39 of a fault relay 40 which is energized in normal operation except following a detected fault, as is described more fully with respect to FIG. 5, hereinafter. The contact 39 is connected by a line 41 to a pair of electronic switches 42, 43 which may be suitable power transistors or the like, as is known in the art. Similarly, the lead 35 is connected through a stabilator position limit switch 44, a line 45, a contact 46 of the fault relay 40, and a line 47 to a pair of electronic switches 48, 49. The electronic switches 42, 48 are connected at one side to a voltage source 50 by a line 51, and the switches 43 and 49 are connected at one side by a line 52 to ground. The switches 42, 49 are energized together by a signal on a line 53 from an amplifier 54 which indicates that positive slewing of the actuator 30 is desired, the switches 43 and 48 are activated by a signal on a line 55 from the amplifier 54 indicating that negative slewing of the actuator 30 is desired. The amplifier 54 is a summing amplifier which provides outputs as the difference between a position command signal on a line 57 and an actual position signal on a line 58, which is derived from a position sensor 59.

Assume that at a given point in time the signal on the line 57 indicates a need to increase the angle of incidence of the stabilator 22. This will cause a positive error so that the amplifier 54 will generate a signal on the line 53 that actuates the switches 42 and 49. Then the voltage source 50 is connected through line 51, switch 42, line 41, the fault relay contact 49 and limit switch 37 to the lead 34 of actuator 30. And, the lead 35 is connected through the limit switch 44, the contact 46, the line 47, and the switch 49 to ground. Therefore, the actuator will move in a direction to increase the angle of incidence of the stabilator 22, until such time that the position sensor 59 generates a signal on the line 58 which is equal to the signal on the line 57, at which time slewing of the actuator will cease. If, on the other hand, the signal on the line 57 indicates a need for a decrease in the angle of incidence of the stabilator 22, the switch 48 will connect the source 50 to the lead 35, and the switch 43 will connect ground to the lead 34, so that the actuator will slew in a direction to move the stabilator to a lesser angle of incidence, until the position sensor 59 provides a signal on the line 58 which is equal to the signal on the line 57. Thus, the amplifier 54, the switches 41, 42, 48, 49, the source 50 and ground comprise the essential portions of a drive means that drives the actuator 30 in relation to the difference in signals on the lines 57 and 58. A proportional servo system could be used instead, if desired.

If desired, the actuators 30, 31 may each be provided with a capability to extend to positions beyond where the stabilator position limit switches 34, 44 deactivate them. In such a case, if one actuator 30, 31 becomes inoperative, the other actuator 31, 30 will provide some or all (depending on its extension capability) of the desired stabilator movement, under manual control as described hereinafter. Also, the actuators 30, 31 may have their own limit switches for safety; these would operate outside the range provided by the stabilator position limit switches 37, 44, etc.

The signal on the line 57 is provided to the controls 32 by a position command signal generator circuit 60, which is described with respect to FIG. 6 hereinafter, and a similar signal is provided to the controls 33 by a position command signal generator circuit 60a (which is similar to the circuit 60).

According to an aspect of the present invention, the actual position of a critical element, which in the embodiment herein is the stabilator 22, is controlled by the two actuators 30, 31 acting in series. Neither of these actuators is effective to provide the desired result in response to automatic position commands without a very similar reaction in the other of the actuators. Thus, the outputs of the position sensor 59 on the line 58 and a similar sensor 59a on a line 64 representative of the positions of the actuators 30, 31 are indicative of whether or not the two completely separate systems are operating correctly, since the likelihood of them both operating incorrectly in the same fashion at the same time is extremely remote. For that reason, the actual position ($\theta1$) of the actuator on the line 58 is compared with the actual position ($\theta2$) of the actuator 31 on the line 64 in fault circuitry 66, to determine if there is more than a threshold amount of disparity in the magnitude of a characteristic thereof (position or rate of change of position, herein).

Figure 5:
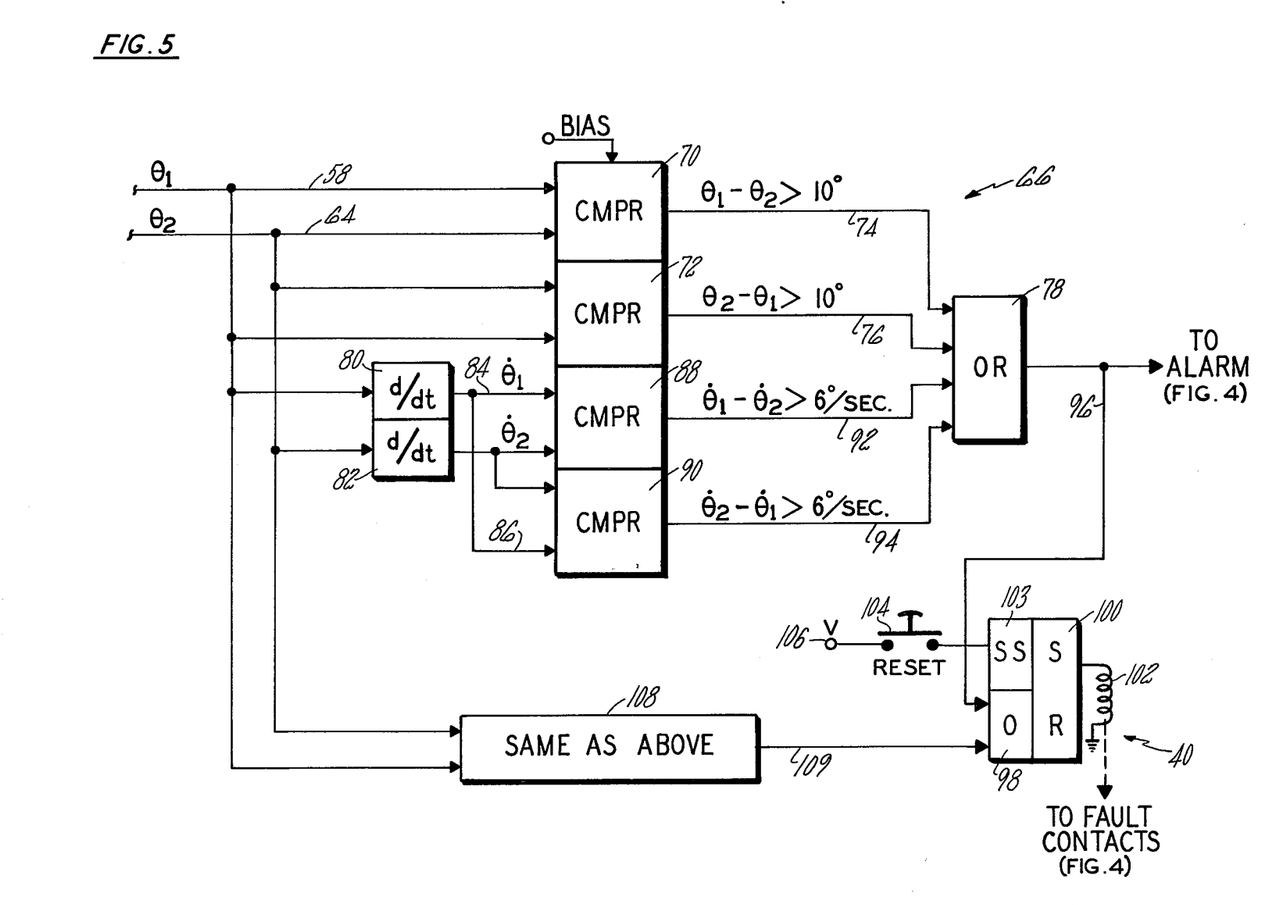
FIG. 5 is a simplified block diagram of a fault detecting circuit for use in the system of FIG. 4.

Referring now to FIG. 5, the position signals on the lines 58 and 64 are compared in biased comparators 70, 72 to determine whether the positions themselves are within some number of degrees of disparity of each other (such as 10°, for instance, although this amount may be varied in dependence on the particular design details of any implementation of the present invention). Thus, if actuator 30 is at a higher position than actuator 31 by more than 10°, the comparator 70 will provide a signal on a line 74; or if the actuator 31 is at a position which is more positive than that of the actuator 30 by 10°, the comparator 72 will provide a signal on a line 76. An OR circuit 78 will respond to either one of these signals. The combined function of the comparators 70, 72 could be provided by a single, well-known window comparator. The position signals on the lines 58, 64 are also differentiated by differentiating circuits 80, 82 so that the rate of change of position will be indicated on a pair of corresponding lines 84, 86. These are similarly applied in an opposite fashion to a pair of biased comparator circuits 88, 90 so as to provide signals to the OR circuit 78 on either of two lines 92, 94 if the rate of change of position between the two actuators differs by more than some rate (which, for instance, might be on the order of 6° per second, but may be altered to suit the detail design parameters of any given implementation of the present invention). Thus the OR circuit 78 will provide a signal on a line 96 if there is too great a disparity in the position or the rate of change of position of the two actuators 30, 31. This signal will operate an OR circuit 98 to reset a bistable device 100, which energizes a relay armature coil 102 of the fault relay 40, which transfers the positions of the contacts 39, 46 (FIG. 4, and similar contacts for the actuator 31) as described hereinbefore. The bistable device 100 may be set by a signal from a single shot 103 in response to momentary pressing of a reset switch 104 which connects it to a suitable source of voltage 106. The single shot 103 provides a pulse of about one second or so, to force the set state to permit the controls to reach stable tracking before allowing an alarm to release the fault relay.

As illustrated in FIG. 5, complete redundancy may again be achieved by utilizing circuitry 108 which is the same as the circuitry 70–96 described hereinbefore. This has an OR circuit similar to the OR circuit 78 which provides a signal on a line 109 whenever either the position or the rate of change of position of the actuators are out of limits. The signal on the line 109 operates the OR circuit 98 to reset the bistable device 100, thereby to deenergize the relay coil 102. On the other hand, if redundancy is not desired, then the circuitry 70–104 described hereinbefore may be used in a non-redundant fashion.

Referring again to FIG. 4, when error is sensed in the fault circuit 66, the fault relay 40 is deenergized, and its contacts 39, 45, etc. are transferred to the lower position. The limit switches are then connected to a manual slew switch 110 through related lines 41a, 48a. In the position shown, the manual slew switch 110 connects the line 41a to a voltage source through a line 111, and connects the line 48a to ground through a line 112, to cause slewing of the actuators 30, 31 for increasing stabilator incidence as described hereinbefore. Similarly, the opposite position of the manual slew switch causes negative slewing. This allows the pilot to slew the actuators in either the plus or the minus direction as he may deem desirable whenever a fault is indicated by any suitable alarm 114, which may comprise any combination of audible and visible alarm means as is known in the art. Normally, when a fault is sensed, the various other control surfaces of the helicopter will have been positioned to compensate for the attitude and/or flight characteristics of the helicopter which resulted from a mispositioning of the stabilator 22; so the condition is not likely to be catastrophic if sensed quickly enough by having tight enough limits on the circuitry of FIG. 5. Normally, the pilot will, upon alarm, trim the position of the stabilator by viewing position indicators (attached to the position sensors 59, 64 but not shown herein) and manipulating the switch 110 so as to place the stabilator 22 in a horizontal position (0°) during forward flight at high and transition speeds (such as in excess of 60 knots), or to place the stabilator at its maximum positive position (+40°) when at low speeds, including hover.

Figure 6:
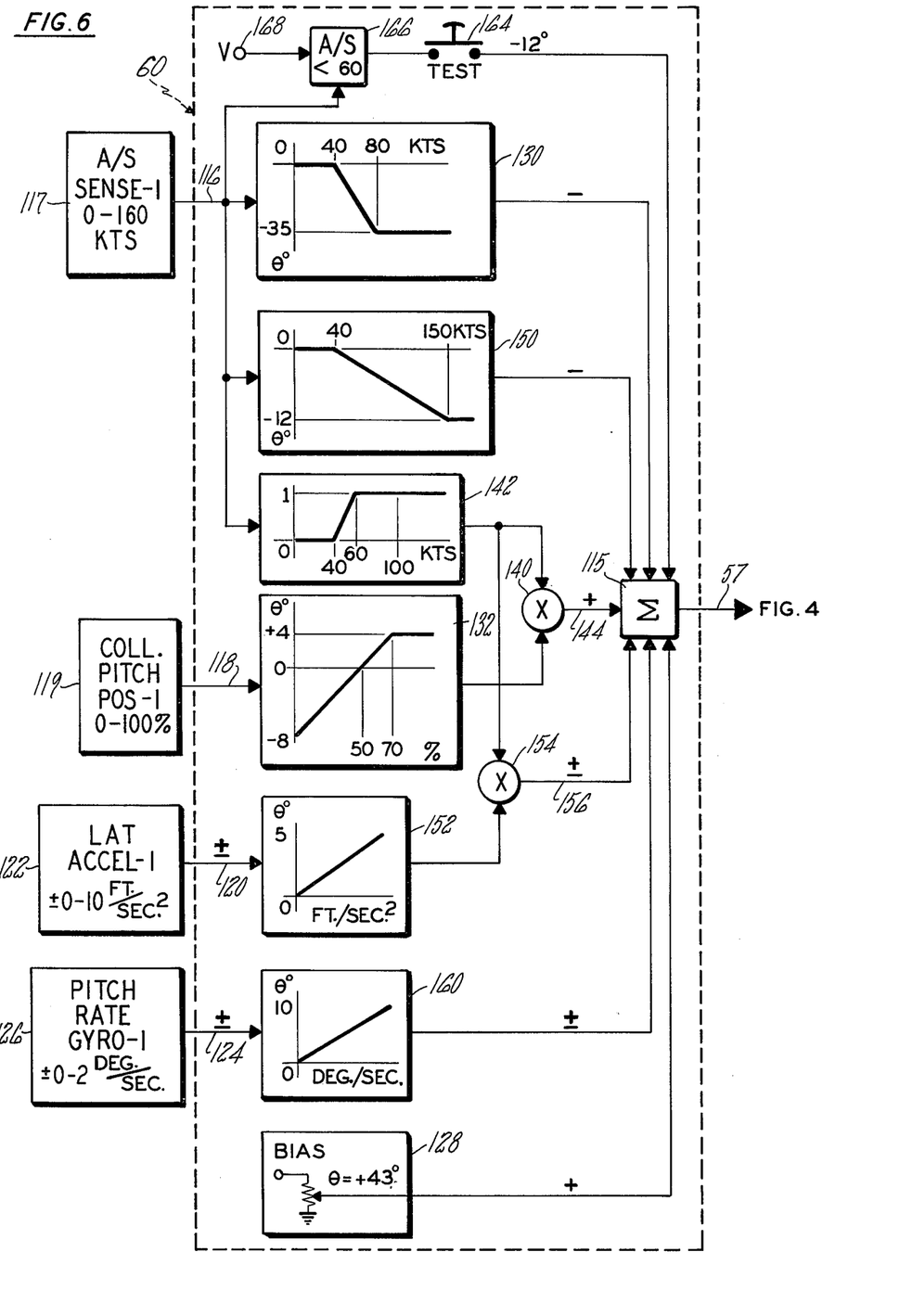
FIG. 6 is a simplified block diagram of a position command generator for use in the system of FIG. 4.

The details of the automatic controls themselves are illustrated in FIG. 6 with respect to the position command generator 60 which controls the actuator 30. The output of the command generator 60 on the line 57 is provided as a summation of a variety of signals, some of which have been described hereinbefore with respect to FIGS. 1–3. The summation of these signals is represented in FIG. 6 as being made in a single summing network 115 although several summations may be combined as is known in the art. For simplicity, the details of such common circuitry and the amplifiers associated therewith have been eliminated herefrom.

A signal indicative of airspeed is provided on a line 116 by an airspeed sensor 117, which may, for instance, comprise a suitable transducer coupled to the regular airspeed pitotstatic system utilized to provide airspeed inputs to a pilot's airspeed indicator. A signal on a line 118 indicative of the percentage of collective pitch is provided by a collective pitch position sensor 119, which may comprise a normal position sensor connected to the collective pitch system, and utilized to provide other stabilization and control functions in the helicopter. A signal on a line 120 indicative of lateral acceleration (that is, translation to port or to starboard)

is provided by a lateral accelerometer 122, and a signal on a line 124, indicative of the rate of rotation about the pitch axis of the helicopter, is provided by a pitch rate gyro 126.

In the particular implementation of the present invention, some thought may be given to the type of failure which is most likely to occur. And, it should be considered that in high speed flight, if the tail should be driven upward quickly, because the stabilator was driven to its maximum positive position as a result of a failure, the helicopter will nose down, probably resulting in an unstable maneuver from which recovery could not be made. On the other hand, if during hover, the stabilator inadvertently went from its maximum positive position (with its tail edge low) to a level position, the tail would simply drop, due to main rotor downwash, which would not be a catastrophic maneuver. For that reason, a bias equivalent to +43° (sufficient to drive the actuator into its +40° position limit during hover) is generated by a bias circuit 128.

In high speed flight, the bias input is largely offset by a function generator 130 (top of FIG. 6) which, at high speeds, generates a signal commanding the stabilator to −35°. As illustrated, the function generator 130 provides no output in response to the airspeed signal on the line 116 indicating between 0 and 40 knots, and provides an output that increases linearly from 40 to 80 knots, and maintains an output for any speed in excess of 80 knots which is equivalent to driving the actuator to −35°. The function generator 130 (and other function generators illustrated generally in FIG. 6) may take any of several, known forms, such as break-point diode/resistor networks, or suitably arranged operational amplifiers. For instance, the function shown in the function generator 130 may be provided by an operational amplifier having a bias input which will keep it biased off until an airspeed signal indicative of 40 knots is received, with a feedback resistor chosen with respect to the airspeed input resistor to provide the desired gain at 80 knots, and a feedback Zener diode selected to provide a flat output for any inputs in excess of 80 knots. The function generator 130 and the bias voltage generator 128 thus operate, in conjunction with one another, to cause the stabilator to be near maximum positive incidence (+40°) at low speeds, and to be nearly level at high speeds, with a transition occurring between 40 and 80 knots in the embodiment herein.

Figure 7:
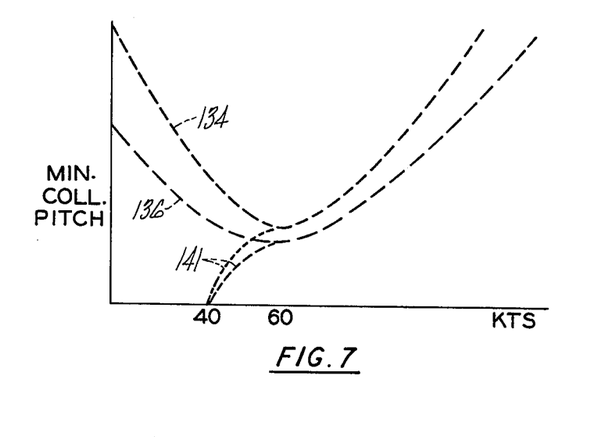
FIG. 7 is a simplified illustration of minimum collective pitch as a function of airspeed.

Another input described hereinbefore, which compensates for nose-up or nose-down with more or less main rotor lift, is the collective pitch input on the line 118. This is passed through a suitable gain and limiting circuit 132 so as to limit the effective collective pitch, which will ever cause a response in the automatic control of the stabilator, to 70% of full collective pitch. The gain of the circuit 132 provides approximately −8° of stabilator incidence in response to 0% collective pitch, and advances through about 0° for 50% to about +4° for 70% or more. By having collective pitch coupling so biased, it allows changes in collective pitch to create negative as well as positive incidence response. Collective pitch is required during hover, and, in fact, as is illustrated in FIG. 7, the minimum collective pitch required is liable to be at a transition speed, such as 60 knots in the embodiment herein. Also, the collective pitch can vary for heavier gross weights as illustrated by the dashed line 134 (FIG. 7) from the collective pitch required for lighter gross weights as illustrated by a dashed line 136. Therefore, the collective pitch is washed out at low speeds by a multiplier circuit 140 (FIG. 6), as illustrated by the dotted lines 141 (FIG. 7). The multiplier 140 is connected to the output of a function generator 142 which provides a gain of between 0 (below 40 knots) and 1 (above 60 knots) to the airspeed signal on the line 112. The output of the multiplier on the line 144 will be insensitive to any collective pitch inputs on the line 116 at airspeeds below 40 knots, will be increasingly sensitive thereto between 40 and 60 knots, and will provide an indication of the output of the function generator 132 at airspeeds in excess of 60 knots. This prevents collective pitch inputs from having any effect during hover and at low speeds, when the maximum angle of incidence of the stabilator is desired; it also provides a smooth transition to the collective pitch inputs at transition speeds, when the stabilator is, on average, positioned somewhere between the maximum angle of incidence and zero angle of incidence.

As is seen in FIG. 7, the collective pitch also increases with high speed, primarily because collective pitch is utilized in a helicopter to add thrust to the main rotor required to sustain higher speeds. In order to compensate for collective pitch which is required for increased speed yet maintain a level stabilator, the airspeed signal on the line 113 is passed through another function generator 150 which has zero output for speeds between 0 and 40 knots, and a linearly increasing output between 40 knots and 150 knots, with a maximum output commanding a −12° angle of incidence of the stabilator. This will not counteract all collective pitch, but only some of the average collective pitch which is used to gain forward airspeed.

As described with respect to FIGS. 1–3 hereinbefore, a canted tail rotor causes changes in tail lift as a consequence of the tail accelerating laterally to the right or to the left. For this reason, the lateral acceleration signal on the line 120 is applied through an amplifier 152 to provide a suitable gain, such as plus or minus 5° of stabilator incidence angle for the nominal maximum lateral accelerations which are expected. However, as described hereinbefore with respect to FIGS. 1–3, the normal lateral translation induced by the tail rotor during hover, which is compensated by port lateral cyclic pitch, thereby inducing a slight port down tilt to the helicopter, should not result in an attempt to drive the stabilator upwardly, due to main rotor downwash. Therefore, the output of the amplifier 152 is passed through a multiplier 154 which is also responsive to the output of the airspeed function generator 142. This causes the effects of the lateral accelerometer to be washed out at speeds below 40 knots, in the same fashion as described with respect to collective pitch hereinbefore. However, at speeds above 40 knots, any slippage of the tail to the right or the left, whether during induced turns or as a result of gust inputs or the like, which causes a commensurate tail-up or tail-down condition, is automatically compensated for by the lateral accelerometer input which is provided by the multiplier 154 on a line 156.

The pitch rate signal input on the line 124 is applied to an amplifier 160 that has a suitable gain so as to give on the order of plus or minus 10° of stabilator incidence angle as a consequence of the pitch rates which are normally expected to be compensated for during normal flight. There are no speed limitations on pitch rate since the stabilator has very little effect at low speeds and no effect (other than becoming coupled to main rotor downwash) at hover; the polarity is such that a nose-down pitch rate (resulting in tail-up) will provide a negative angle of incidence command from the amplifier 160, which in turn will tend to render the stabilator responsive to main rotor downwash thus returning the tail downward. On the other hand, a nose-up condition will tend to increase the angle of the stabilator, but since it will be at its +40° position limit switch, it will have no effect during hover. Thus the pitch input tends to help in one direction and doesn't hurt in the other direction during hover. Otherwise, the pitch input operates during forward flight in the same fashion as on a fixed-wing aircraft; that is, if the nose tends to pitch up, the stabilator will increase its angle of incidence so as to bring the tail up with it, and vice versa, thereby maintaining stable, level flight.

At hover, and all low speeds (e.g., below 40 knots), the bias generator 128 is the only steady state input to the summing network 115; it drives the stabilator to its maximum incidence limit, +40°. The bias may be fine adjusted (such as ±2° around the +43°) to provide zero incidence with maximum airspeed, maximum collective pitch, and with no pitch gyro or lateral accelerometer inputs. This adjustment may be made while the helicopter is secured to a test pad, with compressed air forced into the airspeed sensor 117, and with maximum collective pitch; in the example herein, the high gain airspeed function generator 128 will provide −35°; the low gain airspeed function generator will provide −12° (totaling −47°); and the collective generator 132 will provide +4°, while the bias provides +43° (totaling +47°); so, the stabilator will be at zero degrees. Variations in the generators can be offset by adjusting the bias. And, the bias need only be at least +40° to drive the stabilator to maximum at hover. At 80 knots in actual flight, assuming 50% collective (0°), the airspeed function generators 130, 150 provide −35° and about −5%, so the bias 128 will cause a net of +3°, which is nearly level. Above 80 knots, the stabilator will be increasing level, due to the adjustment described above.

If desired, the high gain airspeed function generator 130 may be altered to provide outputs of +35° at low speeds and 0° at high speeds in conjunction with a bias of +8° from the bias generator 128. Or, the high gain speed function and adjustable bias, with sufficient positive angle command for full incidence at hover, may be provided in other combinations. The gains (e.g., degrees of incidence) described by way of illustrated with respect to FIG. 6 are total gains for two actuators 30, 31; in reality, when two actuators are used in series, the gains for each command generator 59, 60 should be half as great. Of course, the particular gains and break-point speeds may be varied as desired.

At the top of FIG. 6, there is illustrated a test switch 164 which is fed through a pressure switch 166 from a source of voltage 168 of a suitable magnitude so as to provide an input to the summing network 127 equivalent to about −12° of incidence of the stabilator. The pressure switch 166 ensures that the test cannot be performed unless the airspeed signal on the line 116 indicates an airspeed of less than 60 knots. The signal provided by the test switch induces a negative angle so as to tend to drive the stabilator toward the horizontal position, since an increase in stabilator angle of incidence could induce undesirable nose-down maneuvers whereas decreasing incidence would not be likely to induce any catastrophic motion of the helicopter. The test switch 164, by introducing an error, will test the fault circuitry illustrated in FIGS. 4 and 5.

The present invention provides two major stabilator control functions. First, it provides elevator-like stability to a helicopter when in forward flight at high speeds. This action is primarily in response to the pitch rate gyro, and is similar to the action of a horizontal stabilator or elevator in a fixed-wing aircraft. However, it provides additional helicopter stability by having biased collective pitch coupled thereto. The second major function of the present invention is to accommodate a canted tail rotor in combination with a horizontal stabilizer surface at the tail of the helicopter. And, it does this by providing for a different mode of operation at low speeds than at high speeds, so as to avoid the vertical components of main rotor downwash when hovering or at low speeds. By coupling the stabilator angle of incidence to lateral accelerations and pitch rate, the present invention provides stable flight for a helicopter which obtains additional tail lift by means of a canted tail rotor, since this coupling reduces the pitch effects of lateral tail motion of the canted tail rotor.

The invention provides fail-safe positioning of a critical surface by means of the series actuators, independently controlled, with position and rate comparison to determine when either or both of the actuator/control loops is malfunctioning. This fail-safe actuator system not only disengages when it is operating improperly, but it does so in a way that will avoid catastrophic helicopter maneuvers. The exemplary parameters (such as for the function generators illustrated in FIG. 6) are of course variable to suit the implementation of the invention in any particular helicopter design. Also, more than two actuators (with corresponding circuits) may be used in some embodiments. Similarly, although the invention has been shown and described with respect to exemplary embodiments thereof, it should be understood by those skilled in the art that the foregoing and variout other changes, omissions and additions may be made therein and thereto, without departing from the spirit and the scope of the invention.

Having thus described typical embodiments of our invention, that which we claim as new and desire to secure by Letters Patent is:

1. A helicopter, comprising:
a fuselage;
a main rotor disposed for rotation with respect to said fuselage in a first plane oriented to provide vertical lift to said fuselage;
airspeed sensing means for providing a signal indicative of the airspeed of said fuselage;
lateral accelerometer means for providing a signal indicative of lateral accelerations of said fuselage;
a stabilator pivotably disposed about a transverse axis substantially parallel to said first plane at the tail of said fuselage;
positioning means disposed between said stabilator and said fuselage and adapted to rotate said stabilator about its axis for various angles of incidence with respect to said fuselage, said positioning means including an electromechanical actuator and an electrical servo loop for driving said actuator to a desired position in response to a position command signal applied thereto;
a tail rotor adapted to rotate in a second plane, substantially parallel to the longitudinal axis of said fuselage and at a small angle with respect to the vertical axis of said fuselage, oriented to provide a thrust component, parallel to said first plane, to the tail of said fuselage in a direction to stabilize said fuselage against the counter-rotative forces resulting from the rotation of said main rotor, and oriented to provide a vertical lift thrust component to the tail of said fuselage;

and position command signal generating means, connected for response to said airspeed sensing means and to said lateral accelerometer means, for generating a combined command signal, including signal components for causing said positioning means to position said stabilator at substantially zero average angle of incidence at high speeds and at a maximum angle of incidence at low speeds and to position said stabilator to increased or decreased angles of incidence as a result of lateral accelerations of said fuselage in a direction the same as or opposite to, respectively, the direction of thrust component parallel to said first plane provided to the tail of said fuselage by said tail rotor.

2. A helicopter according to claim 1 and further comprising:

a pitch rate gyro means for providing a signal indicative of rates of rotation of said fuselage about its pitch axis; and wherein said position command signal generating means is also connected for response to said pitch rate gyro means to provide, in said combined command signal, a signal component for causing said positioning means to position said stabilator at increased or decreased angles of incidence as a result of said fuselage undergoing nose-up or nose-down, respectively, pitch rates.

3. A helicopter according to claim 1 wherein said position command signal generating means is responsive to said airspeed sensing means to provide said signal component responsive to lateral accelerations only at speeds in excess of low speeds.

4. A helicopter, comprising:

a fuselage;

a main rotor disposed for rotation with respect to said fuselage in a first plane oriented to provide vertical lift to said fuselage;

airspeed sensing means for providing a signal indicative of the airspeed of said fuselage;

collective pitch position sensing means for providing a signal indicating the current degree of main rotor collective pitch;

a stabilator pivotably disposed about a transverse axis substantially parallel to said first plane at the tail of said fuselage;

positioning means disposed between said stabilator and said fuselage and adapted to rotate said stabilator about its axis for various angles of incidence with respect to said fuselage, said positioning means including an electromechanical actuator and an electrical servo loop for driving said actuator to a desired position in response to a position command input signal applied thereto;

a tail rotor adapted to rotate in a second plane, different from said first plane, oriented to provide a thrust component, parallel to said first plane, to the tail of said fuselage in a direction to stabilize said fuselage against the counter-rotative forces resulting from the rotation of said main rotor;

and a position command signal generating means connected for response to said airspeed sensing means and to said collective pitch position sensing means for generating a combined command signal, including signal components for causing said positioning means to position said stabilator at substantially a zero average angle of incidence at high speeds and at a maximum angle of incidence at low speeds and to position said stabilator to increased or decreased angles of incidence as a result of increased or decreased, respectively, collective pitch at speeds in excess of low speeds.

5. A helicopter according to claim 4 wherein said position command signal generating means also provides at high speeds, in said combined command signal, a signal component related to airspeed which is substantially equal and opposite to that portion of the combined command signal relating to collective pitch position required in excess of vertical lift for forward, high speed flight.

6. A helicopter according to claim 4 and further comprising pitch rate gyro means for providing a signal indicative of rates of rotation of said fuselage about its pitch axis; and wherein said position command signal generating means is connected for response to said pitch rate gyro means and provides, in said combined command signal, a signal component for causing said positioning means to position said stabilator at increased or decreased angles of incidence in dependence upon said pitch rate gyro means providing signals indicative of nose-up or nose-down, respectively, rotation of said fuselage about its pitch axis.

7. A helicopter, comprising:

a fuselage;

a main rotor disposed for rotation with respect to said fuselage in a first plane oriented to provide vertical lift to said fuselage;

airspeed sensing means for providing a signal indicative of the airspeed of said fuselage;

lateral accelerometer means for providing a signal indicative of lateral accelerations of said fuselage;

pitch rate gyro means for providing a signal indicative of rates of rotation of said fuselage about its pitch axis;

collective pitch position sensing means for providing a signal indicating the current degree of main rotor collective pitch;

a stabilator pivotably disposed about an axis substantially parallel to said first plane at the tail of said fuselage;

positioning means disposed between said stabilator and said fuselage and adapted to rotate said stabilator about its axis for various angles of incidence with respect to said fuselage, said positioning means including an electromechanical actuator and an electrical servo loop for driving said actuator to a desired position in response to a position command input signal applied thereto;

a tail rotor adapted to rotate in a second plane, at an angle to said first plane, oriented to provide a thrust component, parallel to said first plane, to the tail of said fuselage in a direction to stabilize said fuselage against the counter-rotative forces resulting from the rotation of said main rotor, and to provide a vertical lift thrust component to the tail of said fuselage;

and a position command signal generating means connected for response to said airspeed sensing means, to said lateral accelerometer means, to said pitch rate gyro means and to said collective pitch position sensing means for generating a combined command signal, including signal components for causing said positioning means to provide said stabilator with an average zero angle of incidence at high speeds and with a maximum angle of incidence at low speeds, for causing, only at speeds other than low speeds, said positioning means to position said stabilator to increased or decreased angles of incidence as a result of lateral accelerations of said fuselage in a direction the same as or opposite to, respectively, the direction of thrust component parallel to said first plane provided to the tail of said fuselage by said tail rotor, for causing said positioning means to position said stabilator at increased or decreased angles of incidence in dependence upon said pitch rate gyro means providing signals indicative of nose-up or nose-down, respectively, rotation of said fuselage about its pitch axis, and for causing said positioning means to position said stabilator at increased or decreased angles of incidence as a result of increased or decreased, respectively, collective pitch at speeds in excess of low speeds.

8. A helicopter according to claim 7 wherein said position command signal generating means further comprises:

an adjustable bias source for providing a signal component to cause substantially zero average angle of incidence at high speeds.

9. A helicopter according to claim 7 wherein said positioning means comprises two similar actuators connected in series and said position command signal generating means includes means for providing two, substantially identical combined command signals, each corresponding to a related one of said actuators, each for causing one half of the position response to be induced by said positioning means in response to said position command signal generating means.

10. A helicopter according to claim 9 including position sensing means, each corresponding to one of said actuators, each providing a position signal indicative of the position of the related one of said actuators; and means response to position sensing means to provide an alarm manifestation in response to disparity in excess of a given magnitude between said position signals.

11. A helicopter according to claim 10 further comprising switch means responsive to said fault manifestation for rendering said positioning means unresponsive to the output of said command signal generating means.

12. A helicopter according to claim 11 further comprising manual actuator control means for controlling said actuators in response to manual control; and wherein said switch means is responsive to said fault manifestation for rendering said positioning means responsive to said manual actuator control means.

13. A helicopter according to claim 12 wherein each of said actuators is responsive to said manual actuator control means for causing substantially more than one half of the position response which may be induced by said positioning means in response to said position command signal generator means.

14. A helicopter according to claim 9 wherein said position command signal generating means comprises selectively operable means for providing a fixed signal component in one of said two combined command signals to thereby force disparity in said actuator positions.

15. A helicopter according to claim 14 wherein said fixed signal component causes a decrease in stabilator angle of incidence.

* * * * *

UNITED STATES PATENT AND TRADEMARK OFFICE
CERTIFICATE OF CORRECTION

PATENT NO. : 4,103,848
DATED : August 1, 1978
INVENTOR(S) : Raymond G. Johnson, Jr., Lou S. Cotton, David J. Verzella It is certified that error appears in the above-identified patent and that said Letters Patent are hereby corrected as shown below:

| | |
|---|---|
| Abstract, line 18 | "rotor which provides" should read --rotor provides-- |
| Column 11, line 47 | "of incidence) described by way of illustrated" should read --of incidence) illustrated-- |
| Column 11, line 53 | "switdh" should read --switch-- |
| Column 12, line 37 | "variout" should read --various-- |
| Column 16, line 7 | "response" should read --responsive-- |
| Column 16, line 27 | "9" should read --10-- |

Signed and Sealed this

Tenth Day of April 1979

[SEAL]

Attest:

RUTH C. MASON
Attesting Officer

DONALD W. BANNER
Commissioner of Patents and Trademarks